United States Patent [19]

Ireland

[11] Patent Number: 4,945,751
[45] Date of Patent: Aug. 7, 1990

[54] RE-ROD CUTTER AND BENDER

[76] Inventor: Ralph Ireland, Rte. 4, Box 163, Mankato, Minn. 56001

[21] Appl. No.: 199,381

[22] Filed: May 27, 1988

[51] Int. Cl.⁵ .............................................. B21D 5/10
[52] U.S. Cl. ...................................... 72/384; 72/332; 72/389; 72/464; 72/478; 83/566; 83/198
[58] Field of Search ................. 83/196, 197, 198, 566, 83/567; 72/384, 389, 477, 332, 464, 478

[56] References Cited

U.S. PATENT DOCUMENTS

| | | | |
|---|---|---|---|
| 1,964,550 | 6/1934 | Abramson et al. | 72/389 |
| 2,867,261 | 1/1959 | Traupmann | 72/389 |
| 3,124,192 | 3/1964 | Williams et al. | 72/389 |
| 3,724,256 | 4/1973 | Kroetch | 72/332 |
| 4,004,445 | 1/1977 | Larson | 72/389 |
| 4,041,753 | 8/1977 | Hix | 72/464 |
| 4,265,106 | 5/1981 | McMaster | 72/389 |
| 4,506,535 | 3/1985 | Eubanks | 72/389 |
| 4,638,703 | 1/1987 | Muhr | 72/464 |
| 4,788,847 | 12/1988 | Sterghos | 72/389 |

FOREIGN PATENT DOCUMENTS 972936 8/1975 Canada ................................. 72/332
WO88/04967 7/1988 World Int. Prop. O. ............ 72/464

OTHER PUBLICATIONS

"Cut and Bend Rebard with Fascut", Fascut Industries, Rte. 2, Box 54A, Sauk City, WI 53583.

*Primary Examiner*—David Jones
*Attorney, Agent, or Firm*—Palmatier & Sjoquist

[57] ABSTRACT

The present invnetion is a portable reinforcing rod cutter and bender. A cutting die having elongate and oblique holes for receiving a plurality of rods to be sheared cooperates with a cutting blade connected to a hydraulically operated ram. A female bending die having a pair of pivoting die blocks cooperates with an anvil to bend rods of different diameter to bends having different angles and different diameters. The cutter and bender includes a first gauge for measuring bend angles and a second gauge for measuring the length of rods being bent or sheared. The cutting blade, cutting die, bending die, and anvil are readily removable to allow replacement thereof and to bend and shear different types and sizes of rods and pipes to different bend angles and bend diameters.

17 Claims, 7 Drawing Sheets

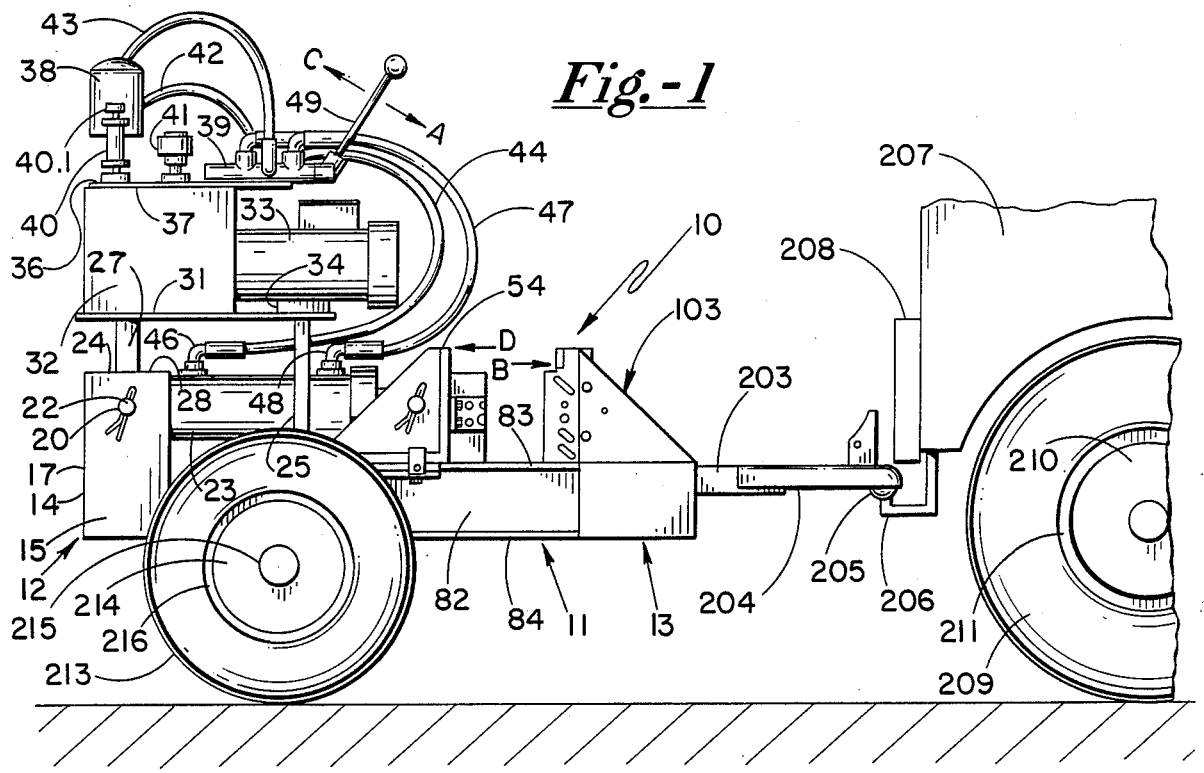

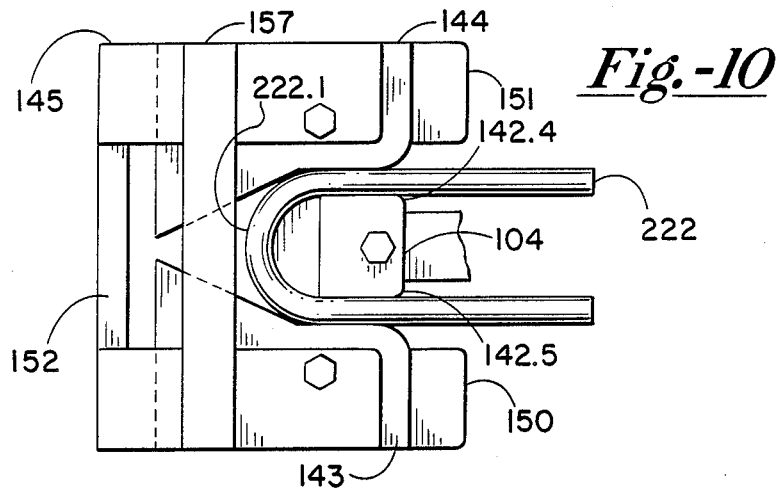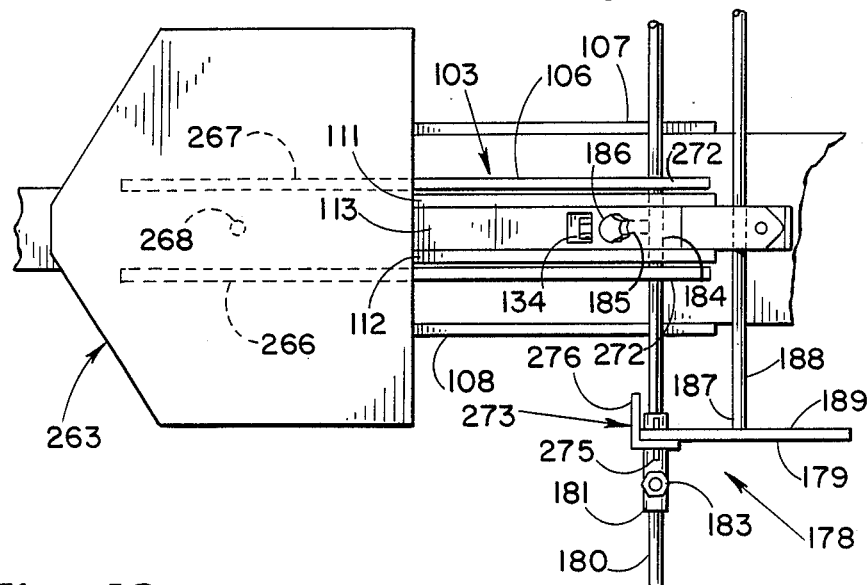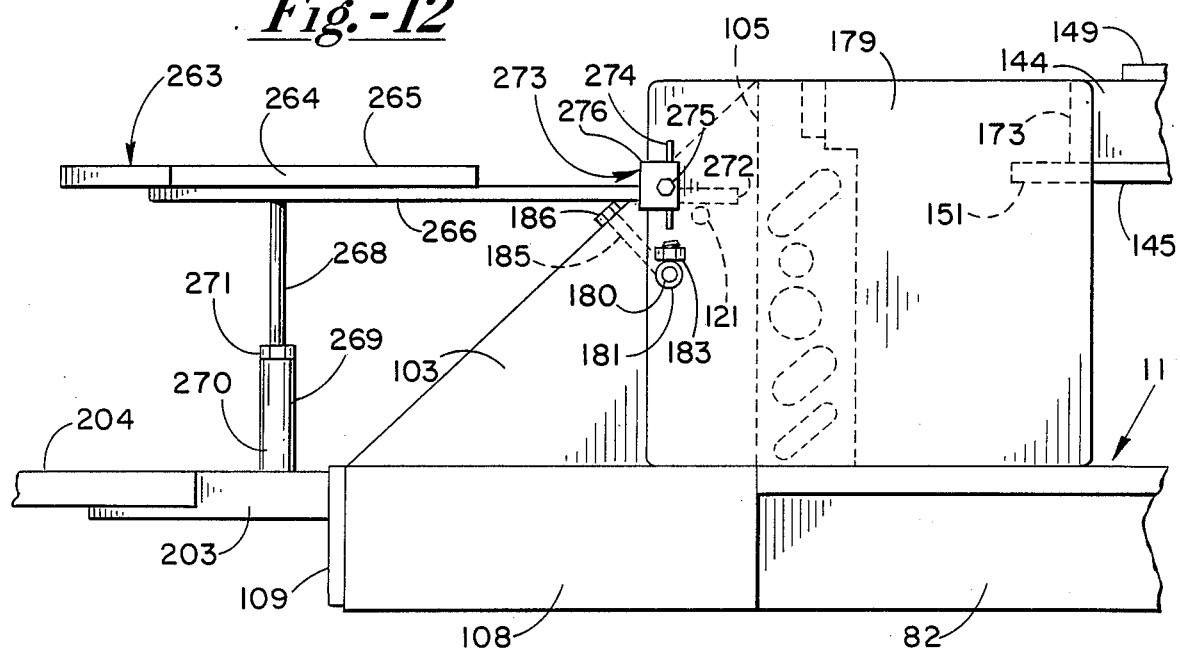

RE-ROD CUTTER AND BENDER

BACKGROUND OF THE INVENTION

1. Field of the Invention

The present invention relates to fabrication apparatus and more particularly to reinforcing rod cutters and benders.

2. Description of the Prior Art

In the concrete reinforcing steel industry, specifications exist for bending reinforcing rods of different diameters to certain bend angles and to particular bend diameters. Rod diameters may range from three-eighth inch to two and one-quarter inches. Bend angles may vary from 0° to 360°. Bend diameters may extend from two and one-quarter inches to twenty-four inches.

Reinforcing rods are typically bent or cut by a fabricator who may be located a great distance from the site the reinforcing rods are needed. For example, highway construction crews building freeways and bridges work in remote regions removed from even local industry. For such crews, on site construction may be delayed by waiting for rods to be cut or bent to prescribed specifications.

SUMMARY OF THE INVENTION

The present invention is an apparatus for cutting and bending reinforcing rods. A feature of the invention is a set of five holes formed in a cutting die. Three of the holes are elongate and oblique for receiving a set of up to four rods to be sheared substantially simultaneously. The remaining two holes are circular for receiving single rods to be sheared. The holes receive rods of different diameters.

A cutting blade connected to a hydraulic ram operated by a control lever opposes the cutting die and is movable thereto on a main frame connecting the ram and the cutting die. The cutting blade shears rods placed in the holes as the ram moves to the cutting die. A holding retaining bar with semicircular retainers for holding rods placed in the circular holes as they are sheared is connected to the ram transversely of and spaced from the cutting blade.

A bending die having a pair of die blocks is also connected to the ram. The die blocks are movable toward and cooperate with the an anvil connected to the cutting die to form a bend in a rod.

The die blocks are eccentrically formed and pivotal. Each die block has a front, bending end and a rear, inwardly extending end. When the rear end of a die block moves in one direction, the front end of the die block moves in the opposite direction.

The die blocks are affixed in a frame having a pair of support plates extending forwardly toward the anvil. Rods rest on the support plates as they are being bent.

The present apparatus includes a pair of gauges. A first gauge is a measuring plate connected to a rod extending transversely from the anvil for measuring the length of a rod to be cut or for determining the site of a bend in a rod. A second gauge is connected to the control lever operating the ram for measuring the angle of a bend in a rod. The second gauge stops forward movement of the ram when a rod has been bent to a predetermined angle. The second gauge may also be utilized to stop forward movement of the ram after rods have been sheared.

In operation of the cutter, one to four rods may be inserted in an elongate and oblique hole formed in the cutting die. The distal ends of the rods are then placed against the measuring gauge which has been adjusted so that the rods are sheared at a prescribed site. The ram is subsequently operated by the control lever to move the cutting blade toward the rods. As the cutting blade abuts and presses against the first rod, the first rod presses against its adjacent rod and the cutting die, which presses against the third rod and the cutting die, which in turn presses against the fourth and last rod and the cutting die. The fourth rod abuts the cutting die. As the ram continues to move forwardly, the cutting blade begins to shear the first rod. The rods may pivot slightly because of the pressure applied by the cutting blade to the first rod. After the cutting blade has entered the first rod about one-third of its diameter, the rod breaks into two pieces at the site of the cut. As the ram continues to move forwardly, the cutting blade shears the second, third and fourth rods in a similar manner. The gauge connected to the control lever may be adjusted so that the forward movement of the ram and cutting blade ceases after the fourth rod has been sheared.

If a single rod is to be sheared, it may be inserted receiving circular holes formed in the cutting die and its distal end placed against the measuring gauge. The control lever is then moved forwardly to move the cutting blade and ram in a forward direction. The retaining bar with the retainers is thus also moved forwardly but travels on the side of the cutting die opposite the side on which the cutting blade moves. As the cutting blade contacts the rod, the rod pivots slightly in the hole and may be retained from further movement by the retainer formed in the retaining bar. As the cutting blade continues its forward motion and begins to cut the rod, the retaining bar also moves forwardly and continues to retain the rod.

In operation of the bender, a rod is placed between the anvil and pivoting eccentric die blocks and on the support plates. A distal end of the rod may be placed against the measuring gauge so that the rod is bent at the appropriate site. The control lever is then operated to move the ram forwardly. As the ram moves, the front ends of the die blocks contact the rod from one direction and press the rod against the anvil. The die blocks continue to move forwardly against the rod with the die blocks passing on each side of the anvil to form a bend in the rod. As the rod is deformed by the die blocks and anvil, an apex is formed in the rod. As the ram continues to move forwardly, the apex of the rod is pressed into the rear, inwardly extensions of the eccentric die blocks. The die blocks thereby pivot so that their front ends move inwardly and toward one another to press against the rod at two sites located on either side of the apex. The forward motion of the ram, which is perpendicular to the rod before the rod is bent, is thus converted into a force applied transversely of the stroke of the ram but perpendicular to the now bent sections. The perpendicular force is applied to the bent sections by the inside front ends of the eccentric die blocks. Hence a force may be continuously applied substantially perpendicular to the rod throughout the bending process.

Once the rod has been deformed to its predetermined angle, the gauge connected to the control lever operates the control lever to stop forward movement of the ram. The control lever is then operated to move the ram rearwardly. The die blocks thus move rearwardly and may pivot to release the bent rod.

Alternate embodiments of the invention include concave recesses formed in the pivotal die blocks and anvil head for bending pipes, and a cutting die having five circular holes for receiving single rods. The embodiment featuring five circular holes includes a retaining plate with five retainers formed therein for maintaining control of the respective single rods as they are being sheared. Another embodiment of the invention includes an anvil having an angled head for bending flat irons.

An advantage of the present invention is that a plurality of rods may be sheared with one stroke of the ram. The elongate and oblique holes permit at least four rods to be sheared with one forward stroke of the ram.

Another advantage of the present invention is that it maintains control of the shearing. If four rods are being sheared, the rods cooperate to limit movement of the rod being sheared. Features that contribute to the retention of control over the shearing include the obliqueness of the hole and the mass of the heavy adjacent reinforcing rods. If a single rod is being sheared in a circular hole, the retaining bar having the retainers formed therein maintains control over the rod as it is cut.

Still another advantage of the present invention is that bends of an unlimited number of degrees may be formed. Bends of 0° to 180° may be formed with only one forward stroke of the ram. Bends of 0° to 360° may be formed with merely two forward strokes of the ram.

Still another advantage of the present invention is that bends of a wide range of radiuses or diameters may be formed. A greater bend radius is formed by increasing the distance between the die blocks and connecting an anvil having a greater radius. While the angle of a bend in a rod is controlled by the distance the ram travels in a forward direction, the radius of a bend is controlled by the distance between the die blocks and the radius of the anvil.

Still another advantage of the present invention is that the size of the pivoting die blocks remains constant regardless of the angle of the bend, or radius of the bend.

Still another advantage of the present invention is that the die blocks apply a force substantially perpendicular to the rod throughout the bending process. A perpendicular force is desired because it may apply a greater force to the rod for a given amount of energy expended by the hydraulic ram. As the bending process is initiated, the front ends of the die blocks apply a force perpendicular to the rod. When the bending process draws to a close, and the die blocks pivot, the inside front ends of the die blocks apply a force perpendicular to the deformed rod.

Still another advantage of the present invention is that a number of its features are removably connected to allow the fabrication of a variety of rods and pipes to a number of different angles and radiuses. The die blocks and frame are removably connected to the ram so that a different set of die blocks, such as die blocks for bending rods to a larger radius or die blocks for bending pipes, may be utilized. The anvil is removable so that an anvil having a different radius to correspond with the spacing of the die blocks is connectable. An anvil having an angled head for bending flat irons is also connectable. The cutting blade is removable to allow its ready replacement. The cutting die is removable to allow the use of a cutting die having five circular holes for single rods. Finally, the retaining bar is removable to allow a holding bar with five retainers formed therein to be used.

Still another advantage of the present invention is that it is portable. Furthermore, it shears and bends a larger size rod for portable fabrication apparatus.

A still further advantage of the present invention is that the pivoting die blocks allow a greater tolerance or leeway in the structure of a bending die. Rods typically have a degree of resiliency. For example, if a bend of 90° is desired, the rod may have to be bend initially to 91° to account for the amount the rod will spring back after it is removed from the die blocks. Different rods have different degrees of resiliency. With the present invention a single pair of die blocks may be utilized to bend a variety of rods to many different angles and diameters.

BRIEF DESCRIPTION OF THE DRAWINGS

FIG. 1 shows an elevation view of a cutter and bender fabrication apparatus.

FIG. 2 is an enlarged detail side elevation view of the shearing mechanism of the fabrication apparatus shown in FIG. 1.

FIG. 10 shows the bending mechanism of FIG. 9 in a closed position.

FIG. 11 shows an enlarged detail top plan view of a gauge and bending table connected to the cutter and bender of FIG. 1.

FIG. 12 shows an elevation view of the bending table and gauge of FIG. 11.

DETAILED DESCRIPTION OF THE PREFERRED EMBODIMENTs

Figure 3:
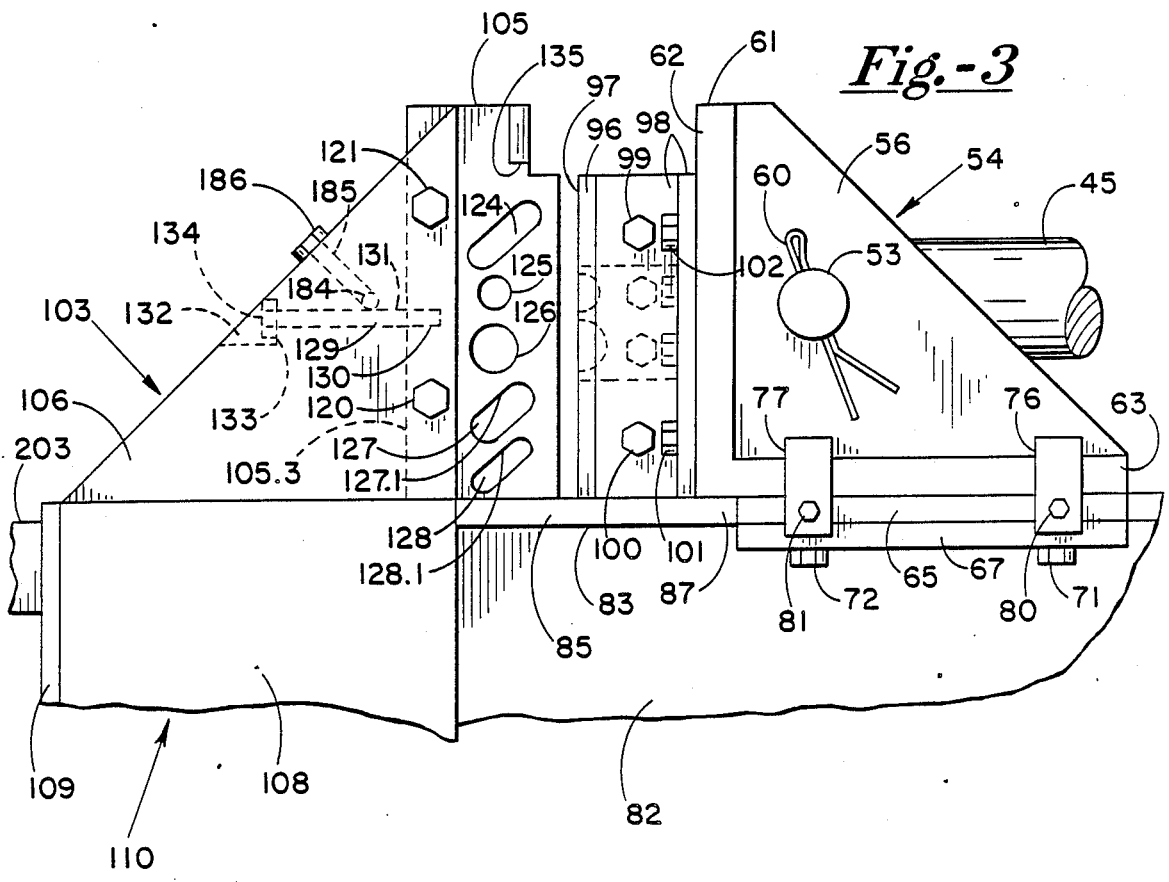
FIG. 3 is a detail side elevation view of the opposite side of the shearing mechanism shown in FIG. 2.

As shown in FIG. 1, a cutting and bending apparatus 10 has a main elongate frame or beam 11. The main frame has a rear end 12 and a front end 13. A support plate 14 is connected to rear end 12 of the frame 11. The plate 14 has a first side 15, a second side 16 (not shown) opposite the side 15, and a rear side 17. Side 15 is connected to a first side 18 (not shown) of frame 11. Side 16 is connected to a second side 19 (not shown) of frame 11. Rear side 17 is connected to a rear end 20 (not shown) of the frame 11.

A pair of apertures 20–21 (not shown) are formed in respective sides 15–16 of support plate 14. The apertures 20–21 receive a pin 22 for connection to a hydraulic cylinder 23.

The hydraulic cylinder 23 is connected to the pin 22 in the cavity 24 formed by the support plate 14. The hydraulic cylinder 23 may also connected to a first support member 25 and a second support member 26 (not shown). First and second support members 25–26 are connected to respective sides 18–19 of frame 11. The hydraulic cylinder 23 is connected to plate 14 and members 25–26 so that it is substantially parallel to main frame 11.

A first support arm 27 is connected to a top end 28 of side 15 of plate 14. A second support arm 29 (not shown) is connected to a top end 30 (not shown) of side 16 (not shown) of plate 14. Support arms 27 and 29 and support members 25–26 are connected to and support a first support platform 31.

The first support platform 31 supports and is connected to a hydraulic oil tank 32. An electric motor housing 33 is connected to the oil tank 32 and may be supported by and affixed to a support block 34 extending from the first support platform 31.

A second support platform 36 is connected to a top end 37 of the oil tank 32. An oil filter 38 and a hydraulic valve housing 39 are connected to the second platform 36. A dipstick holder 40 and a breather 41 are also connected to the second platform 36. Holder 40 has a dipstick 40.1.

A first hose 42 for delivering pressurized oil to the hydraulic valve housing 39 is connected between the filter 38 and the valve 39. A second hose 43 for returning oil to the filter 38 is connected between the valve housing 39 and the filter 38. A third hose 44 for delivering oil to the hydraulic cylinder 23 for movement of the piston 45 is connected between a first cylinder connection 46 and the valve housing 39. A fourth hose 47 for delivering oil to the hydraulic cylinder 23 for rearward movement of the piston 45 is connected between a second cylinder connection 48 and the valve housing 39.

A control lever 49 is connected to the hydraulic valve housing 39. The control lever 49 controls a set of valves 50 (not shown) which in turn controls the flow of oil through the hoses 44 and 47. The control lever 49 is operated to move the piston 45 forwardly and rearwardly and to stop movement of the piston 45.

Figure 7:
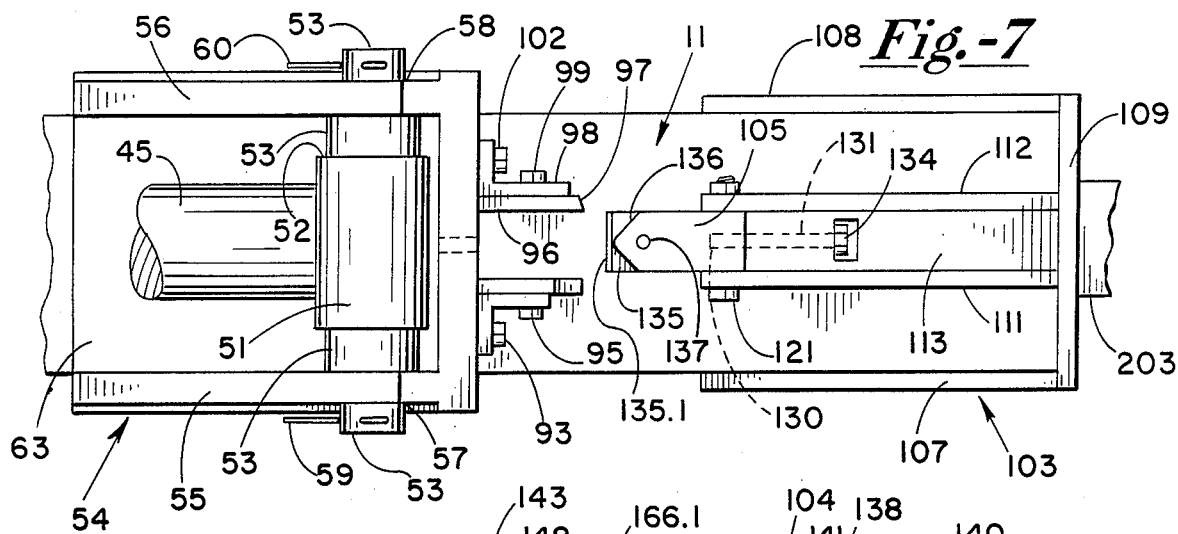
FIG. 7 shows an enlarged detail top plan view of FIG. 2.

As shown in FIG. 7, the piston 45 has a piston head 51 forming an aperture 52. A pin 53 is removably held in the aperture 52. A ram or driver 54 having a pair of first and second sides 55–56 is connected to the pin 53. The first and second sides 55–56 form a pair of respective first and second apertures 57–58 for the pin 53. The pin 53 is secured in the apertures 57–58 by a pair of cotter pins 59–60.

As shown in FIGS. 1–3, the ram 54 has an angle iron 61 which includes a front support plate 62 and a bottom support plate 63. If desired, the angle iron 61 may be formed by rigidly connecting, such as by welding, plate 62 to plate 63. Sides 55–56 are rigidly connected at substantially right angles to plates 62–63.

As shown by FIGS. 2 and 3, the ram 54 further includes a pair of spacing or clearance plates 64–65 and a pair of holding plates 66–67. Plate 66 is connected to bottom plate 63 by a first pair of bolts 68–69. Plate 67 is connected to bottom plate 63 by a second pair of bolts 71–72.

Clearance plates 64 and 65 are connected between respective plates 66 and 67 and the bottom plate 63 of angle iron 61. Each plate 64–65 has a pair of oversized apertures (not shown) formed therein for receiving the bolts 68–69 and 71–72 and to allow transverse movement of the clearance plates 64–65.

Clearance plates 64–65 are transversely adjustable by a plurality of support brackets or clearance tabs 74–77. The brackets 74–77 are rigidly connected such as by welding to the plates 55–56 and have a plurality of suitably affixed bolts 78–81. By adjusting the bolts 78–81, transverse play or movement of ram 54 may be controlled.

The main frame or beam 11 includes a central bar 82 integrally connected to a top bar 83 and a bottom bar 84. The bars 83–84 extend transversely outwardly from central bar 82. Top bar 83 forms a first extension 84 and a second extension 85.

The ram 54 is supported by and movable longitudinally on top bar 83. The holding plates 66–67 extend transversely inwardly from the bolts 68–69 and 71–72 and the spacing plates 64–65 to movably clamp the ram 54 to the main frame 11 and may limit vertical movement of the ram 54. The spacing plates 64–65 are substantially the same thickness as the top bar 83 may abut a pair of respective edges 86–87 of the respective bar extensions 84–85 to limit transverse movement of the ram 54. A silicone spray may be applied to the frame 11 to facilitate movement of the ram 54.

Figure 4:
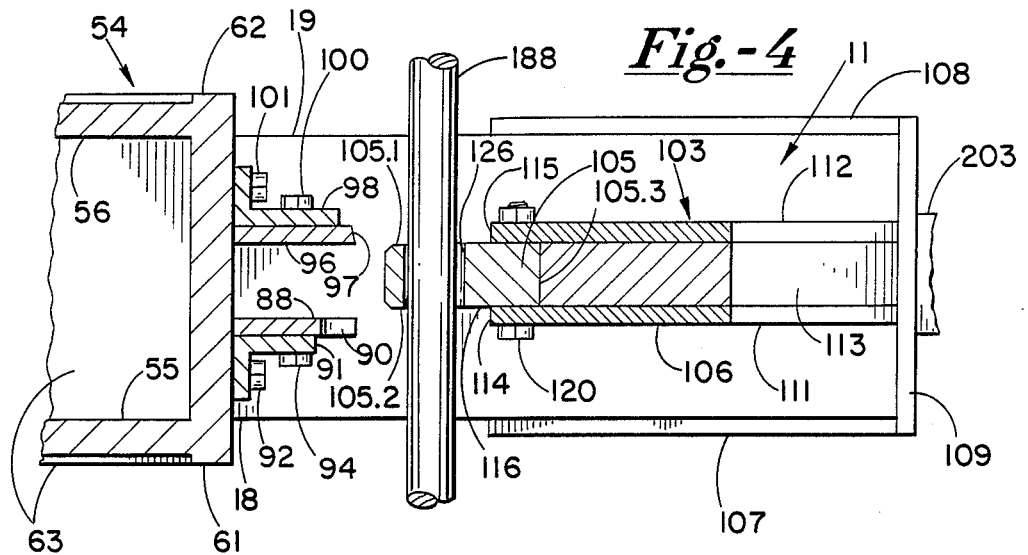
FIG. 4 shows an enlarged detail section at 4—4 of FIG. 3 with the shearing mechanism in a closing position.

As shown in FIGS. 2–4, a vertically disposed and elongate retaining bar or pressure bearing means 88 having a pair of semicircular retainers or recesses 89–90 formed therein is removably connected to the front support plate 62 of the ram 54 by a bracing angle iron 91. The angle iron 91 is bolted to the retaining bar 88 and the front support plate 62 by a set of bolts 92–95. Bolts 92–93 are connected to the front support plate 62. Bolts 94–95 are connected to the retaining bar 88.

As shown in FIGS. 3–4, a vertically disposed cutting shear blade 96 having a vertically disposed cutting edge 97 is removably connected to the front support plate 62 of the ram 54 by a bracing angle iron 98. The angle iron 98 is bolted to the cutting blade 96 and the front support plate 62 by a set of bolts 99–102. Bolts 99–100 are connected to the cutting blade 96. Bolts 101–102 are connected to the front support plate 62. The blade 96 is substantially parallel to and laterally spaced from the bar 88.

As shown in FIGS. 1–4, a ram receiver 103 is connected to the main frame 11 and opposes the movable ram 54. The receiver 103 includes an anvil 104, a rod receiving member or cutting die or shear blade 105 with a first and second die face 105.1–105.2 and a rear end 105.3, and a receiver support member 106. The receiver 103 may also include a pair of receiver reinforcing side plates 107–108 rigidly connected to the top and bottom bars 83–84. The receiver 103 may further include a front end plate 109 rigidly connected to a front end 110 of the frame 11.

The receiver support member 106 is rigidly connected longitudinally such as by welding to the top bar 83 of the frame 11. The support member 106 is formed from a pair of triangular members 111–112 and a control member 113. Triangular members 111–112 and central member 113 may be formed from one piece and be integrally connected. Members 111–112 include a pair of respective rearward extensions 114–115 to form a receptacle 116 for the cutting die 105. Each extension 114–115 includes a pair of apertures 118–119 (not shown) for a pair of removable pins 120–121.

The cutting die 105 is removably connected to the receiver support member 106 by the pins 120–121. The die 105 has a pair of apertures 122–123 (not shown) formed therein for receiving the respective pins 120–121.

The cutting die 105 has a set of transverse holes 124–128 formed therein for receiving rods to be sheared. Elongate holes 124, 127, and 128 each receive a set of rods where each set is typically four or less. The holes 124, 127, and 128 are formed obliquely in the die 105 to be oriented downwardly and forwardly. The holes 124, 127, and 128 are of different width to receive rods of different diameters. Elongate holes 124, 127, 128 have a set of respective upper edges 124.1, 127.1, 128.1 as shown in FIG. 3. Circular holes 125–126 each receive a single rod and are of different diameters. The holes 125–126 oppose respective retainers 89–90 so that rods received in the holes 125–126 cooperate with and are controlled by the respective retainers 89–90. The holes 125–126 are of similar diameter to respective retainers 89–90. The diameter of the holes 125–126 are slightly greater than the diameter of rods the holes 125–126 receive.

The cutting die 105 is further secured to the receiver support member 106 by a removable pin 129. A threaded aperture 130 is formed in the cutting die 105 and an aperture 131 is formed in the central member 113 of the receiver support member 106 for receiving the pin 129. A recess 132 is formed in the central members 113 to provide a vertical base 133 for a head 134 of the horizontal pin 129.

As shown in FIGS. 2–3 and 7–9, the cutting die 105 includes an anvil base support 135, a secondary base support 135.1, and an anvil V-shaped back support 136. A threaded aperture 137 is formed in the anvil base 135 for receiving a bolt 138 for securing the anvil 104. An aperture 138.1 is formed in the anvil 104 for the bolt 138.1. Typically, in bending rods, an anvil 104 having a curved face 139 is removably connected to the supports 135, of 135.1 and 136 of the cutting die 105. A protective washer 140 is oriented between an upper face 141 of the anvil 104 and a head 142 of the bolt 138.

Figure 8:
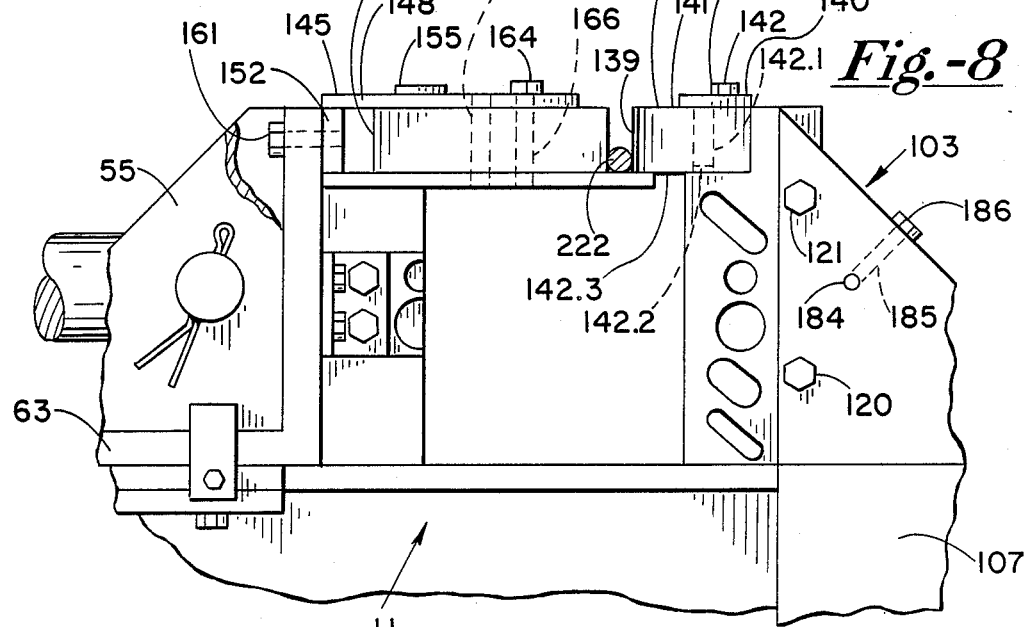
FIG. 8 is an enlarged detail elevation view of the bending mechanism of the fabrication apparatus shown in FIG. 1.
Figure 9:
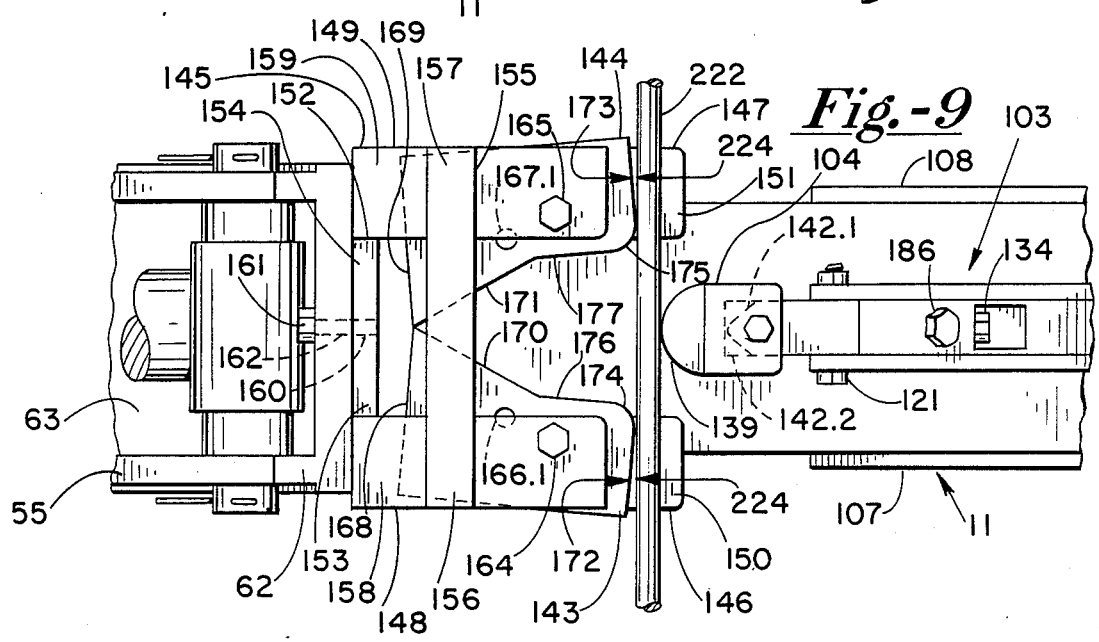
FIG. 9 is a detail top plan view of the bending mechanism shown in FIG. 8 in a closing position.

As shown in FIGS. 8–9, a V-shaped recess 142.1 is formed in the anvil 104 for cooperating with the V-shaped anvil back support 136. The anvil 104 further includes a base support recess 142.2 for cooperating with base support 135. A bottom edge 142.3 of the anvil 104 cooperates with the secondary base support 135.1. As shown in FIG. 10, the anvil 104 includes a pair of rounded edges 142.4–142.5.

A pair of pivoting eccentric die blocks or cams or dies 143–144 is connected to the ram 54 and oppose the anvil 104 of the ram receiver 103. The die blocks 143–144 are connected in a frame 145 having a pair of lower longitudinal framing members 146–147 and a pair of upper longitudinal framing members 148–149. The lower framing members 146–147 include a pair of respective extending rod support arms 150–151 for supporting a rod to be bent or deformed by the die blocks 143–144 and the anvil 104.

The frame 145 further includes a rear transverse framing bar 152 having a pair of opposing ends 153–154. Framing members 146 and 148 are connected to end 153. Framing members 147 and 149 are connected to end 154.

The frame 145 still further includes a top transverse bracing bar 155 having a pair of ends 156–157. End 156 is connected to an upper face 158 of member 148. End 157 is connected to an upper face 159 of member 149. The bracing bar 155 is connected to members 148–149 forwardly of the rear bar 152.

Figure 16:
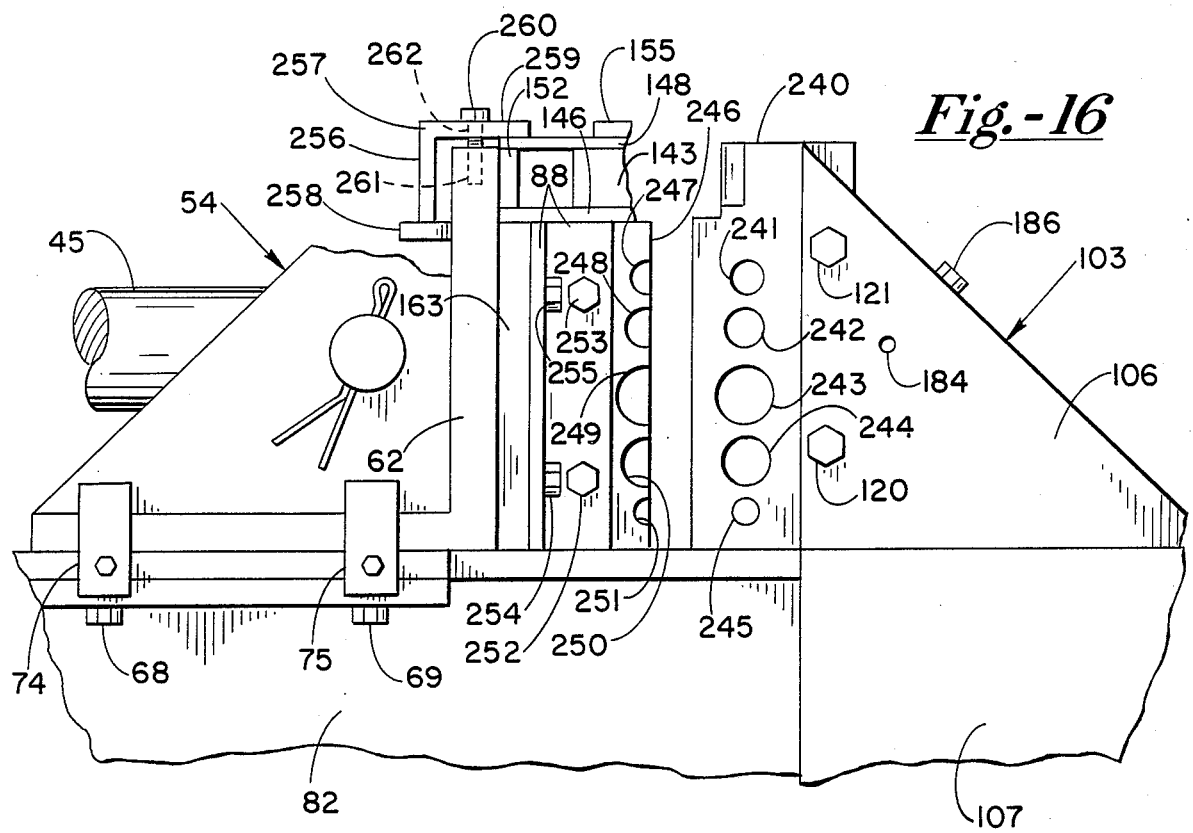
FIG. 16 shows a modified form of the shearing mechanism of FIG. 2.

The frame 145 is typically removably connected to the ram 54. A threaded aperture 160 for receiving a removable bolt 161 is formed in the rear framing bar 152. An aperture 162 is also formed in the ram front support plate 62 for receiving the bolt 161. The frame 145 may be supported by the angle iron 98 as well as the bolt 161. Furthermore, as shown in FIG. 16, the frame 145 may be supported by a support 163 connected between the ram front support plate 62 and the angle iron 88 and the angle iron 98 (not shown).

Figure 14:
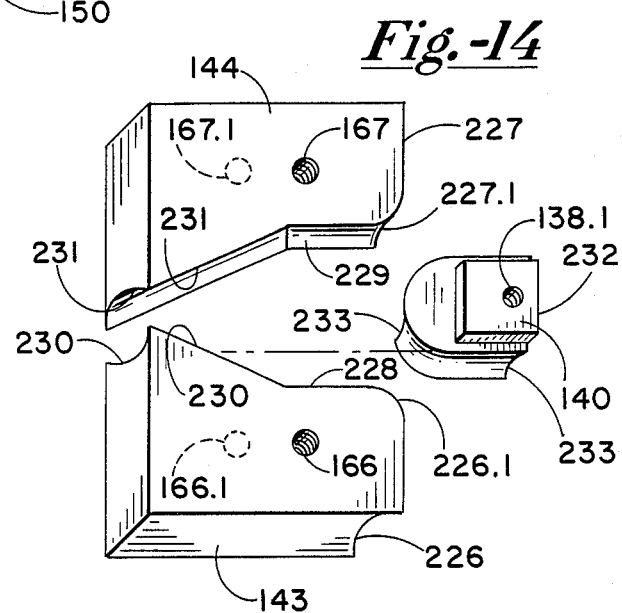
FIG. 14 shows a modified form of the bending mechanism of FIG. 8.

The die blocks 143–144 are pivotally connected to respective framing members 146–149 by a pair of respective removable pins 164–165. As shown in FIG. 14, a pair of apertures 166–167 for receiving respective pins 164–165 are formed in respective die blocks 143–144. Apertures (not shown) are formed in framing members 146–149 for the pins 164–165. Apertures 166–167 may be located further rearwardly in die blocks 143–144, as shown by a pair of respective apertures 166.1–167.1 in FIGS. 8, 9, and 14.

The die blocks 143–144 are eccentrically shaped. The die blocks 143–144 have a pair of respective oblique ends 168–169 extending rearwardly and inwardly toward one another. The oblique ends 168–169 have a pair of respective oblique cam faces 170–171. The die blocks 143–144 also include a pair of respective front bending ends 172–173, a pair of respective curved bending ends 174–175, and a pair of respective inner bending ends 176–177. The faces 170–171 and ends 172–177 may have slightly rounded recesses (not shown) for receiving a rod.

As shown in FIG. 11–12, a measuring or first gauge 178 has a measuring plate 179 and a measuring rod 180. An elongate tube 181 extends through an aperture 182 formed in the plate 179 and is rigidly connected to the plate 179. The tube 181 receives the rod 180 so that the measuring plate 179 is slidable thereupon. A first setscrew 183 is threadable in the tube 181 and against the rod 180 to secure the plate 179 to the rod 180.

The measuring rod 180 is removably connected to the ram receiver support member 106. The member 106 receives the rod 180 in an aperture 184 formed in triangular members 111–112 and central member 113. A threaded aperture 185 is formed in central member 113 for receiving a second removable setscrew 186. The setscrew 186 affixes the rod 180 in the ram receiver support member 106. Aperture 185 does not communicate with aperture 131.

The measuring plate 179 extends longitudinally and rearwardly. As shown in FIG. 11, a distal end 187 of a rod 188 is placed against face 189 of the measuring plate 179 to gauge the length of a rod section to be sheared.

Figure 17:
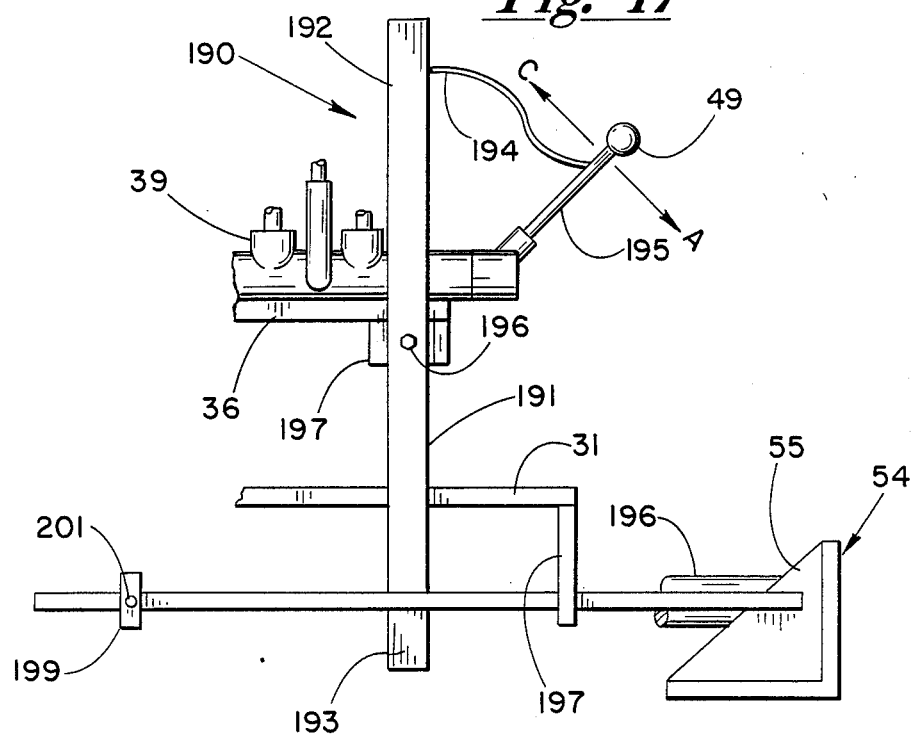
FIG. 17 shows a schematic view of a gauge controlling forward movement of the ram of FIG. 1.

As shown in FIG. 17, a control or second gauge 190 includes a pivot arm 191 having a top end 192 and a bottom end 193. A flexible element 194 is connected between the top end 192 and an end 195 of the control lever 49. The pivot arm 191 is pivotally connected by a pivot pin 196 to a pivot plate 197 rigidly affixed to support platform 36.

The second gauge 190 further includes a gauging rod 196 rigidly affixed to a first side 55 of the ram 54, a guide plate 197 having a guiding aperture 198 (not shown), and a stop 199 connected to the rod 196. The guide plate 197 is rigidly affixed to the first support platform 31. The rod 196 is movably connected in the aperture 198 of the guide plate 197. A threaded aperture 200 (not shown) is formed in the stop 199 for receiving a setscrew 201. A longitudinal aperture 202 (not shown) for receiving the rod 196 is also formed in the stop 199. The stop 199 is movably connected to the rod 196.

The stop 199 extends transversely and inwardly from the rod 196 and the bottom end 193 of the pivot arm 191. The bottom end 193 of arm 191 may be biased outwardly to abut an inner edge (not shown) of the rod 196.

As shown in FIG. 1, a hitch support or tongue 203 and hitch arm 204 is connected to the front end 13 of the main frame 11. The hitch arm 204 may be connected to a ball hitch 205 of an automobile hitch 206 connected to an automobile 207 having a rear bumper 208. The automobile 207 includes a tire 209 and a wheel 210 having a rim 211.

The cutting and bending apparatus 10 is transported on a trailer (not shown). The trailer includes a tire 213 and a wheel 214 having an axle 215 and a rim 216.

In operation of the cutter 10 when the circular holes 125-126 are to be utilized, the first step is to determine the type of rod to be sheared. After the rod is selected, the length of the rod section is chosen and as shown in FIG. 11-12, the measuring gauge 178 is operated to set the desired length of the rod section. The measuring rod 180 of the gauge 178 is affixed to the ram receiver support member 106 by operating the setscrew 185. The measuring plate 179 is then affixed to the rod 180 by the set screw 183 so that the face 189 of the measuring plate 179 is set the appropriate distance from the cutting die face 105.1.

As shown in FIG. 17, after the first gauge 178 has been operated, the second gauge 190 is set so that forward movement of the ram 54 ceases after the cutting blade 96 shears the rod. The second gauge 190 is set by connecting the stop 199 to a prescribed site on the rod 196.

As shown in FIGS. 4-6 and 11-12, after the first gauge 178 and second gauge 190 have been set, a rod 188 inserted in hole 126. The distal end 187 of rod 188 is placed against the face 189 of the measuring plate 179 so that the rod 188 is sheared at the prescribed site.

With rod 188 in hole 126, as shown in FIGS. 4, 5, 6 and 17 the control lever 49 is moved in the forwardly direction of arrow A to move the ram 54, the cutting blade 96, and the retaining bar 88 in the forwardly direction of arrow B. As the ram 54 approaches the ram receiver 103, the cutting blade 96 travels by the first face 105.1 of the cutting die 105 and the retaining bar 88 travels by the second face 105.2.

Figure 5:
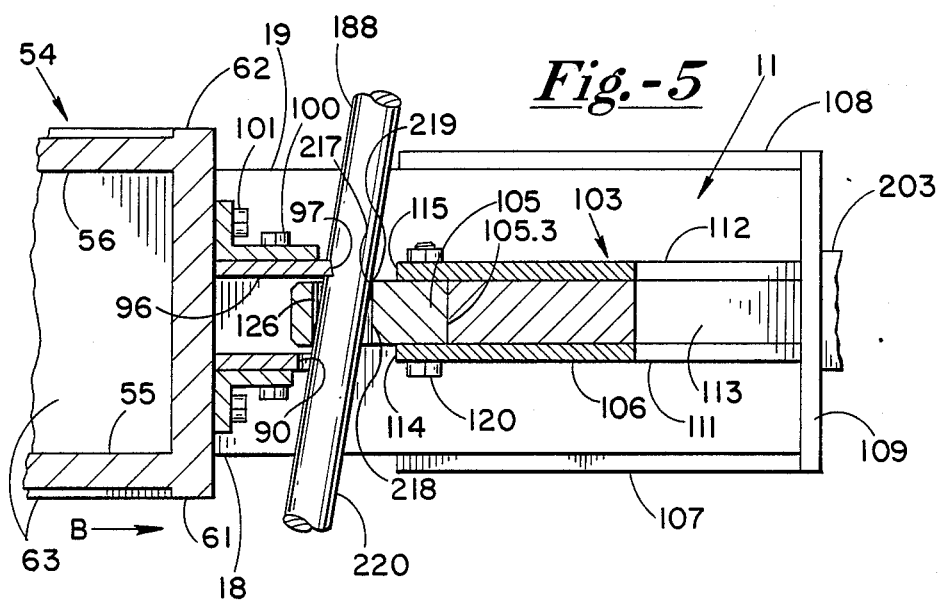
FIG. 5 shows the shearing mechanism of FIG. 4 shearing a rod.

Subsequently, as shown in FIG. 5, the cutting edge 97 of cutting blade 96 contacts rod 188 and presses against the rod 188 so that rod 188 pivots slightly in hole 126. As a front edge 217 of the rod 188 presses against end 218 of the die 105 forming the hole 126, the cutting edge 96 begins to enter the rod 188. An edge 219 of end 218 of the cutting die 105 forming hole 126 may also enter the rod 188.

The retainer 90 receives the rod 188 as rod 188 pivots in hole 126. The retainer 90 may prevent excessive vertical movement, as well as horizontal movement, of the rod 188. As the cutting edge 97 moves forwardly and enters the rod 188, the retainer 90 also moves forwardly to press against the rod 188 so that a pivoted section 220 of rod 188 may return to a perpendicular orientation with main frame 11.

When the cutting blade 96 has penetrated about one-third of the diameter of rod 188 and applied sufficient pressure to rod 188, rod 188 is sheared into a first section 220 and a second section 221. Section 221, the rod section measured by measuring plate 17, typically flies from the cutting die 105. Rod section 220 typically remains in hole 126 and retainer 90.

Figure 6:
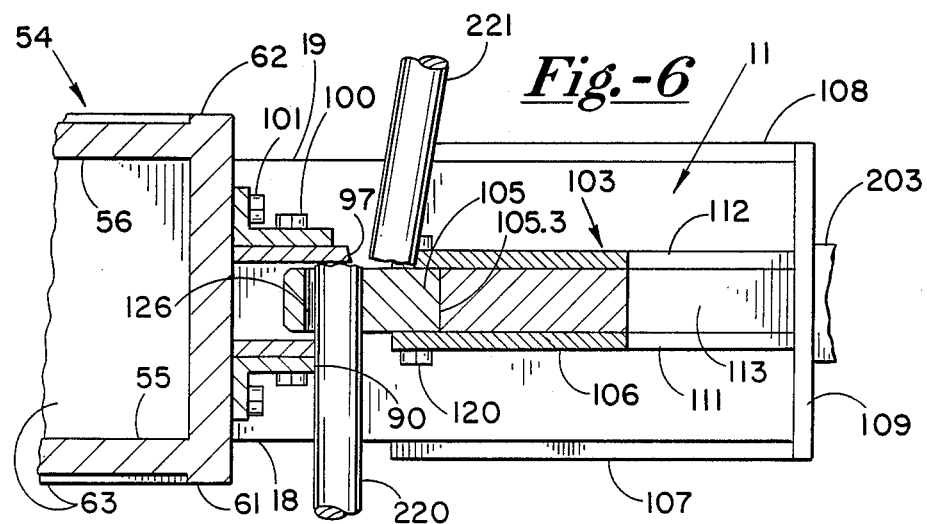
FIG. 6 shows the shearing mechanism of FIG. 4 after a rod has been sheared.

After the rod 188 is sheared, as shown in FIG. 6, the ram 54 continues to move forwardly until the control lever 49 is operated by the second gauge 190 to stop forward movement of the ram 54. As ram 54 moves forwardly, it continues to move rod 196 and stop 201 in the forward direction. Guide 197 continues to guide the movement of the rod 196. As and after rod 188 is sheared, stop 201 may press against the lower end 193 of the pivot arm 191 so that the arm 191 pivots and the upper end 192 of the arm 191 moves rearwardly. When the upper end 192 moves sufficiently rearwardly, the control lever 49 is operated by the flexible element 194 to move in the rearward direction of arrow C so that movement of the ram 54 ceases. The operator may then move control lever 49 further in the direction of arrow C to move the ram 54 in the rearwardly direction of arrow D. Rod section 220 is then removed from hole 126 or its distal end placed against measuring plate 179 to be measured for subsequent shearing of the rod section 220.

In operation of the cutter 10 when the elongate holes 124, 127, and 18 are to be utilized, the first step is to determine the type of rod and number of rods to be sheared. Typically, four rods are sheared at substantially the same time with one forward stroke of the ram 54. However, one to three rods may be sheared in one of the holes 124, 127, and 128 at the same time with one forward stroke of the ram 54.

After the type of rod and number of rods to be sheared have been selected, the measuring gauge 178 is set to the prescribed length. The second gauge 190 is set so that forward movement of the ram 54 ceases when the rods have been cut. When one of the elongate holes 124, 127 or 128 is being used, the stop 201 may be set somewhat rearwardly of its location on rod 196 than when one of the circular holes 125-126 for a single rod is being used. Once the first gauge 178 and second gauge 190 have been set, the rods may be inserted in one of the elongate and oblique holes 124, 127, or 128 and the distal ends placed against the face 189 of the measuring plate 179.

After the rods are placed in one of the elongate holes 124, 127, or 128, the control lever 49 is operated to move the ram 54 in the forward direction of arrow B. As the ram 54 approaches the ram receiver 103, the cutting blade 96 travels by the first face 105.1 of the cutting die 105 and the retaining bar 88 travels by the second face 105.2.

Subsequently the cutting edge 97 of cutting blade 96 contacts a first rod positioned in the uppermost and rearward section of the elongate hole 124, 127 or 128. The first rod may pivot slightly in a manner similar to rod 188, which is shown in circular hole 125.

The first rod is pressed against the cutting die 105 and a second rod positioned below and in front of the first rod by the cutting blade 96. The second rod in turn may be pressed against the cutting die 105 and a third rod positioned below and in front of the second rod. The third rod in turn may be pressed against the cutting die 105 and a fourth rod positioned below and in front of the third rod. The fourth rod in turn may be pressed against the cutting die 105.

After the cutting blade 96 has contacted the first rod, the cutting edge 97 begins to cut the first rod. The first rod may also be cut by an edge of the cutting die 105 forming hole 124, 127 or 128.

After the cutting edge 97 has penetrated about one-third of the diameter of the first rod, the first rod is sheared into two rod sections at the site of the cut. The section which was measured by the measuring plate 179 typically falls from the cutting die 105. The remaining rod sections typically remains in the hole 124, 127, or 127.

After the first rod has been sheared, the ram continues to move in the forward direction of arrow B to the second rod. As the cutting blade 96 contacts the second rod, the second rod may pivot slightly in a manner similar to the first rod so that the rod section being measured moves forwardly and its opposing rod section moves rearwardly. The second rod is thus pressed against the cutting die 105 and the third rod, which in turn is pressed against the cutting die 105 and the fourth rod. The fourth rod is in turn pressed against the cutting die 105.

After the cutting edge 97 has penetrated about one-third of the diameter of the second rod, the second rod breaks into two sections at the site of the cut. The section which was measured by the measuring plate 179 typically falls from the cutting die 105. The remaining rod section typically remains in the hole 124, 127, or 128.

The third and fourth rods are sheared in a manner similar to the second rod. It should be noted that an operator may retain manual control over the rods as they are being sheared. The operator may grasp the proximal ends of the rods after he has operated the control lever 49 to move the ram 54 in the forward direction of arrow B. The mass of the reinforcing rods and the proximity of the rods to one another may tend to counteract forces created by shearing any one rod. The cutting blade 96 acts on one rod at a time, but the four rods are sheared with the same forward stroke of the ram 54.

After the four rods have been sheared, the ram 54 continues to move forwardly until the control lever 49 is operated by the second gauge 190 to stop forward movement of the ram 54. The second gauge 190 operates the control lever 49 in a similar manner as when a single rod is sheared in a circular hole 125 or 126; however, as noted, stop 201 may be set rearwardly of the prescribed location on rod 196 for the rods placed in the circular holes 125-126.

In operation of the bender 10, as shown in FIGS. 7-10, the first step is to select a rod 222 to be bent. Since the angle of the bend to be formed in rod 222 is determined by the distance of forward movement of ram 54, stop 201 of gauge 190 is set to the prescribed location on rod 196. The site of the bend in rod 222 may be measured by setting the measuring plate 179 to the prescribed location on rod 180.

The rod 222 to be bent is then placed on the extending rod support arms 150-151 and between anvil 104 and the die blocks 143-144. The control lever 49 is moved in the forward direction of arrow A to move the ram 54 and die blocks 143-144 and rod 222 in the forward direction of arrow B. As the ram 54 moves forwardly, a front edge 223 of rod 222 contacts the curved face 139 of anvil 104 and a rear edge 224 of rod 222 is pressed against the front ends 172-173 of the respective die blocks 143-144. The rod 222 thus begins to be deformed and an apex 222.1 (as shown in FIG. 10) is formed in rod 222. As the ram 54 continues to move in the forward direction, the die blocks 143-144 travel on either side of the anvil 104 and the curved bending ends 174-175 of the respective die blocks 143-144 are pressed against the rod 222. The apex 222.1 of the rod 222 is subsequently pressed into the oblique cam faces 170-171 of respective die blocks 143-144, thereby pivoting the die blocks 143-144 so that the inner bending ends 176-177 of the die blocks 143-144 are pressed against rod 222 on either side of the apex 222.1 now formed in rod 222. Thus a force perpendicular to the forward direction of the stroke of ram 54 is applied to the rod 222. Apertures 166.1-167.1 may be used to provide a faster inward kick or bending force by the bending ends 174-177 for a given amount of forward movement by the ram 54. It should be noted that, although the degree of the pivot varies, the die blocks 143-144 may pivot from less than 1 degree to 45 degrees.

When rod 222 has been bent to the prescribed angle as shown in FIG. 10, the gauge 190 operates the control lever 49 to stop forward movement of ram 54. The control lever 49 is operated by stop 201 moving the lower arm 193 of pivot arm 191 so that pivot arm 191 pivots to move upper arm 192 rearwardly. Arm 192 moves the control lever 49 rearwardly by flexible element 194. Stop 201 is connected to rod 196 which is in turn connected to and moved forwardly by ram 54. Rod 196 is guided by guide 197.

After forward movement of ram 54 ceases, the operator manually moves the control lever 49 in the rearward direction of arrow C to move the ram 54 and die blocks 143-144 in the rearward direction of arrow D so that the now bent rod 222 is released. Die blocks 143-144 may pivot as the ram 54 moves rearwardly. Rounded edges 142.4-142.5 may prevent the anvil 104 from forming undesirable serrations in rod 222.

Figure 13:
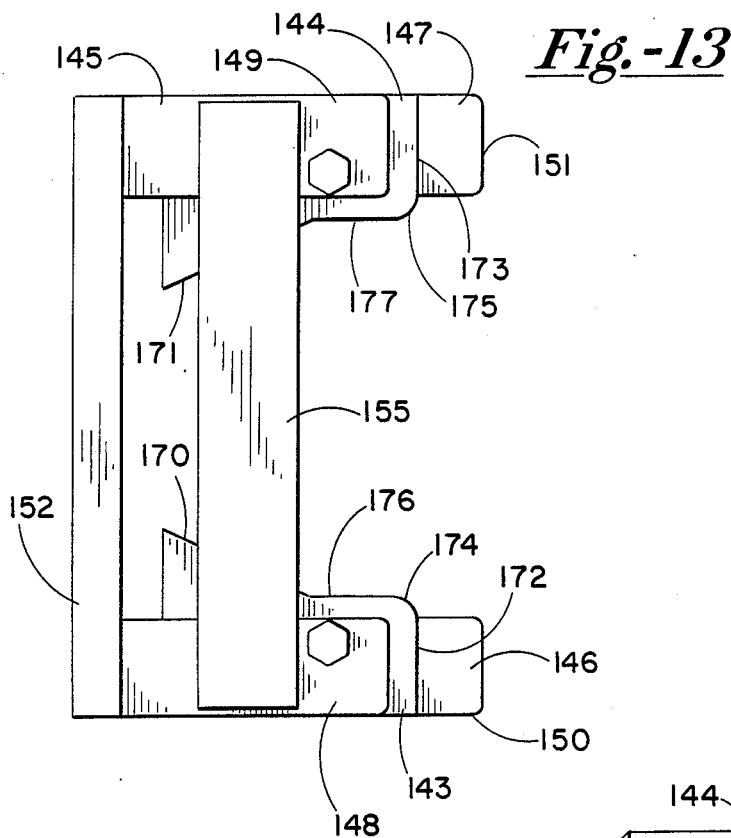
FIG. 13 shows a modified form of the bending mechanism of FIG. 8.

As shown in FIG. 13, a modified form of the present invention which may be used for forming bends of a larger radius. In this modified form, the die blocks 143-144 are spaced apart and connected in a frame 145 having a greater transverse length. The die blocks 143-144 shown in FIG. 13 may remain the same size as the die blocks 143-144 shown in FIGS. 8-10. The distance the die blocks 143-144 are spaced apart varies with the radius of the bend which is desired. As the distance between the die blocks 143-144 becomes greater, the radius of the bend in the rod will also become greater. While the gauge 190 or the distance the ram 54 travels forwardly controls the angle of the bend, the distance between the die blocks 143-144 controls the radius of the bend. An anvil 104 having a radius corresponding to the distance between the die blocks 143-144 is connected to the ram receiver 103.

As shown in FIG. 14 another modified form of the present invention for bending pipes includes die blocks 143-144 having a pair of respective front concave bending ends 226-227, a pair of respective curved concave bending ends 226.1-227.1, a pair of respective concave inner bending ends 228-229, and a pair of respective concave oblique ends 230-231. This embodiment would also include an anvil 232 having a concave face 233. The concave ends 226-231 and concave face 233 allow a greater surface area to come into contact with a pipe when it is bent.

Figure 15:
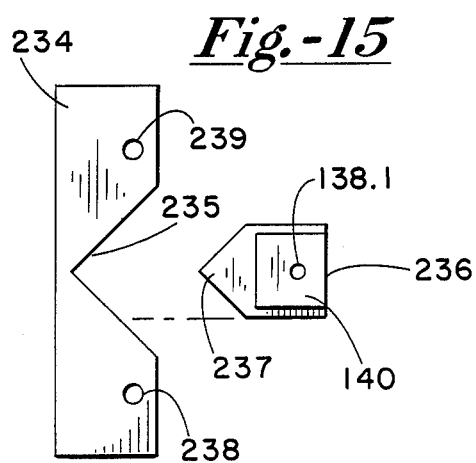
FIG. 15 shows a modified form of the bending mechanism of FIG. 8.

As shown in FIG. 15, another modified form of the present invention includes a female die block 234 for bending flat irons having angled recess 235 formed therein. The embodiment includes an anvil 236 having an angled head 237. The die block 234 includes a pair of respective apertures 238-239 for connection to the frame 145. Die block 234 may be used for bending rods as well as flat irons to a number of different angles, but is typically used for 90° bends.

As shown in FIG. 16, another modified form of the present invention includes a cutting die 240 having a set of five circular holes 241-245. The embodiment includes a retaining bar 246 having a set of retainers 247-251 formed therein. Retainers 247-251 oppose and cooperate with rods placed in the respective holes 241-245. Retainers 247-251 correspond in diameter to respective holes 241-245. Retaining bar 246 is connected to an angle iron 88 having a plurality of bolts 252-255.

As shown in FIG. 16, another modified form of the present invention includes a quick release hold down bar 256 for releasably clamping the frame 145 having the die blocks 143-144 to the support plate 163. The hold down bar 256 includes an angle iron 257 and a transverse bar 258 rigidly connected to the back of the ram support plate 62. Angle iron 257 is rigidly connected at its bottom end to the top end of the transverse bar 258 and spaced from the back and top faces of the ram support plate 62. A front end 259 of the angle iron 257 clamps the frame 259 to the support plate 163 and the retainer angle iron 88 by a set screw 260 releasably connected in a threaded aperture 261 formed in ram support plate 62. An aperture 262 is formed in the front and 259 of the angle iron 257 for receiving the set screw 260. It should be noted that one hold down bar 256 or a pair of bars 256 may be employed to quickly and releasably clamp the frame 145 to the ram 54. The bar 256 may be utilized in combination with removable bolt 161 to secure the frame 145 to the ram 54.

As shown in FIG. 11-12, another modified form of the present invention includes a planar bending table 263 having a planar top 264 with a planar face 265, parallel support arms 266-267, and a threaded adjustable leg 268. The leg 268 is removably connected and adjustable in a threaded vertical leg receptor 269. The leg receptor 269 is rigidly connected at the bottom end 270 to the tongue 203. A nut 271 cooperates with leg 269 and leg receptor 269 and may be tightened against receptor 269 to secure the leg 268 at a prescribed height. The leg 268 and support arms 266-267 are rigidly connected to the bottom of the plate 264. The support arms 266-267 extend rearwardly and horizontally. A rear end 272 of each arm 266-267 may rest on a bolt 121 of the ram receiver 103. The planar table 263 operates to form planar bends in rods and cooperates with a tab 273 connected to the measuring plate 179. The tab 273 is adjustably connected in a vertical elongate slot 274 formed in the measuring plate 179 by a removable pin 275. The tab 273 has a top end 276 which may lie in substantially the same plane as planar face 265 of the planar top 264 and the top ends of the extending rod support arms 150-151 so that a bent rod may be placed on end 276, face 265 and ends 150-151 to form bends in substantially the same plane.

I claim:

1. A fabrication apparatus for bending and shearing rods and the like, comprising
   a main frame,
   a driver movably connected to said main frame and bending means connected to said main frame and to said driver and being operated by said driver for bending rods, said bending means including first and second pivotal spaced apart bending dies and an anvil, said dies and said anvil movable across each other, each of the bending dies including a front end and an inner, angled side, the distance between front portions of the inner sides being greater than the diameter of the anvil to receive the anvil therebetween, the distance between rear portions of the inner sides being less than the diameter of the anvil whereby with one stroke of the driver the front ends are initially abuttable against the rod to bend the rod with the anvil, the bent rod subsequently being drivable between the die blocks, the bent rod then being bearable against the rear portions to pivot the die blocks so that the front portions are drivable against the bent rod to further bend the rod, and
   shear means connected to said main frame and to said driver and being operated by said driver for shearing a rod, said shear means including first and second shear blades movable across each other, said first shear blade including an elongate hole for receiving a rod to be sheared, said elongate hole having an edge disposed obliquely in relation to the directional movement of said driver and said second shear blade, the rod being shearable by said shear means.

2. The apparatus of claim 1, wherein said elongate hole receives at least two rods and said shear means shears the rods with one stroke of said driver.

3. The apparatus of claim 1, wherein said shear means includes a second and third elongate hole, each said hole receiving rods of different diameter.

4. The apparatus of claim 1, wherein said first shear blade is removable to allow another shear blade with holes of different diameters or different widths to be connected to said main frame.

5. The apparatus of claim 1, further comprising a measuring gauge for measuring the length of rod sections to be cut, said measuring gauge comprising
   a measuring rod connected to and extending from said main frame, and
   a measuring plate slidably connected on said measuring rod for receiving the distal ends of rods to be sheared so that rod sections of a prescribed length may be sheared.

6. A fabrication apparatus for cutting rods and the like, comprising
   a main frame,
   a driver movably connected to said main frame, and
   shear means connected to said main frame and operated by said driver for shearing a rod, said shear means including first and second shear blades moving across each other, said first shear blade including a rod receiving means for receiving a rod to be sheared, said shear means including a pressure bearing means for retaining the rod in said rod receiving means by applying pressure to the rod as said shear means shears the rod, said pressure bearing means including a retaining bar having a recess formed therein, said bar connected to a front end of said driver, said retaining bar extending frontwardly from said front end of said ram, said retaining bar and recess cooperating with a rod disposed in said rod receiving means to maintain the rod in said rod receiving means as said shear means shears the rod.

7. The apparatus of claim 6, further comprising a measuring gauge for measuring the length of rod sections to be cut, said measuring gauge comprising
   a measuring rod connected to and extending from said main frame, and
   a measuring plate slidably connected on said measuring rod for receiving the distal ends of rods to be sheared so that rod sections of a prescribed length may be sheared.

8. A fabrication apparatus for bending rods and the like, comprising
   a main frame,
   a driver movably connected to said main frame and bending means connected to said main frame and to said driver and being operated by said driver for bending rods, said bending means including first and second pivotal spaced apart bending dies and an anvil, said dies and said anvil moving across each other, each of the bending dies including a front end and an inner, angled side, the distance between front portions of the inner sides being greater than the diameter of the anvil to receiver the anvil therebetween, the distance between rear portions of the inner sides being less than the diameter of the anvil whereby with one stroke of the driver the front ends initially abut and bend the rod with the anvil, the bent rod subsequently being driven between the die blocks, the bent rod bearing against the rear portions to pivot the die blocks so that the front portions are driven against the bent rod to further bend the rod, and
   a control gauge for controlling movement of the driver and comprising a pivot arm and a guide rod, the pivot arm pivotally connected to said frame and having a first end and a second end, said first end connect to a control lever operating said driver, the guide rod connected to said driver and having an adjustable stop, said second end of said pivot arm being contacted and operated by said stop moving against and contacting said second end of said pivot arm, said pivot arm pivoting when said second end is moved by said stop, said first end of said pivot arm operating said control lever when said pivot arm pivots to cease operation and movement of said driver so that the distance of movement of said driver and the angle of a bend in a rod are gauged by adjusting the stop to a prescribed location on said guide rod.

9. A fabrication apparatus for bending rods and the like, comprising
   a main frame,
   a driver movably connected to said main frame and bending means connected to said main frame and to said driver and being operated by said driver for bending rods, said bending means including first and second pivotal spaced apart bending dies and an anvil, said dies and said anvil moving across each other, each of the bending dies including a front end and an inner, angled side, the distance between front portions of the inner sides being greater than the diameter of the anvil to receive the anvil therebetween, the distance between rear portions of the inner sides being less than the diameter of the anvil whereby with one stroke of the driver the front ends initially abut and bend the rod with the anvil, the bent rod subsequently being driven between the die blocks, the bent rod bearing against the rear portions to pivot the die blocks so that the front portions are driven against the bent rod to further bend the rod, and
   a measuring gauge for measuring the site of a bend in a rod and comprising a measuring rod connected to and extending from said main frame, and a measuring plate slidably connected on said measuring rod for receiving the distal ends of rods to be bent so that rods may be bent at a prescribed site.

10. A fabrication apparatus for bending rods and the like, comprising
    a main frame,
    a driver assembly connected to said main frame and bending means connected to said main frame and to said driver and being operated by said driver for bending rods, said bending means including first and second pivotal spaced apart bending dies and an anvil, said dies and said anvil moving across each other, each of the bending dies including a front end and an inner, angled side, the distance between front portions of the inner sides being greater than the diameter of the anvil to receive the anvil therebetween, the distance between rear portions of the inner sides being less than the diameter of the anvil whereby with one stroke of the driver the front ends initially abut and bend the rod with the anvil, the bent rod subsequently being driven between the die blocks, the bent rod bearing against the rear portions to pivot the die blocks so that the front portions are driven against the bent rod to further bend the rod, and
    a bending table connected to said main frame and a tab connected to a measuring plate slidably connected to a measuring rod affixed to and extending from said main frame, said bending table and tab being adjustable in height to correspond with the height of said bending means so that rod bends may be formed in substantially the same plane.

11. A fabrication apparatus for cutting rods and the like, comprising
    an elongate main frame,
    a hydraulic cylinder mounted on said main frame,
    a ram slidably mounted on the frame for movement longitudinally along said frame, said ram being connected to and moved along the frame by said cylinder, said ram having a front end,
    an elongate and vertically disposed cutting shear blade having a vertically disposed cutting edge and being affixed onto said front end of said ram,
    an elongate and vertically disposed retaining bar parallel to the shear blade and removably affixed to said front end of said ram in a laterally spaced relation to said shear blade, said retaining bar having a forwardly extending front edge with a pair of first and second rounded rod clamping recesses, one of said recesses disposed above other of said recesses,
    a ram receiver rigidly connected to said main frame forwardly of said ram, said ram receiver having a rear end confronting the front end of the ram,
    a cutting die removably affixed on said rear end of said ram receiver and having a set of first, second, third, fourth, and fifth transverse holes formed therein, said first, fourth, and fifth holes being elongate, each of said elongate holes having width different than the width of other elongate holes and each having an oblique shearing edge disposed obliquely with respect to said vertically disposed cutting edge and obliquely of the direction of the sliding movement of the ram, said elongate holes extending downwardly and away from said cutting edge, each of said elongate holes receiving a set of rods of size corresponding to the respective width of the hole, each said second and third holes being circular and having a rounded shearing edge, each said circular hole receiving a rod of a different diameter than other said circular hole, said second and third holes being disposed between said first and fourth holes, said cutting die being receivable between said shear blade and said retaining bar as said ram moves along said frame so that a rod may be disposed in one said circular hole and be received by one of said recesses as said retaining bar bears against the rod during shearing of the rod, and alternately, a plurality of rods may be disposed in one of said elongate holes and be sheared sequentially by said cutting edge with one forward stroke of said hydraulic cylinder and said ram, the rods in said holes bearing against said shearing edges as the rods are being sheared, said shearing edges and said cutting edge of said shear blade cooperating to shear rods in said holes.

12. A fabrication apparatus for bending rods and the like, comprising a main frame, a hydraulic cylinder mounted on said main frame, a ram slidably mounted on the frame for movement longitudinally along said frame, said ram being connected to and moved along the frame by said cylinder, said ram having front and rear ends, a die frame removably affixed on the front end of said ram by a means including a vertically disposed bar rigidly connected to said front end of said ram, said means including a hold down bar connected to said rear end of said ram and extending therefrom to project over said die frame in clamping relation, said hold down, bar having a clamping end for clamping said die frame to said vertical bar and said ram, said die frame having a pair of forwardly projecting support arms laterally spaced from each other for supporting a rod to be bent, a ram receiver rigidly connected to said main frame forwardly of said ram, said ram receiver having a rear end confronting the ram, an anvil removably affixed on said rear end of said ram receiver and confronting the die frame on the ram receiver, said anvil having a rounded rear bending face for engaging and bending a rod carried on said support arms, the anvil having parallel faces lying substantially parallel to the direction of movement of the ram, a pair of substantially stationary rod bending dies each mounted on a pivot on the die frame, the dies being spaced from each other to receive the anvil and a bent rod therebetween when the ram is moved toward the ram receiver, each of the bending dies having a front face confronting the ram receiver and the rod on the support arms, and each of the bending dies also having an inner side face confronting the side face of the other die, and each of the dies having a camming face in end to end and oblique relation to the adjacent inner side face, the camming faces of the bending dies being oriented convergently toward the ram, the die mounting pivots permitting pivoting of the dies in response to receiving the anvil and bent rod between the dies as the ram moves the dies along the anvil, the bent rod camming along the camming faces to move the inner side faces toward each other and against the bent rod to apply pressure on the rod and complete the bending of the rod.

13. A fabrication apparatus for cutting rods and the like, comprising a main frame, a driver movably connected to said main frame, and shear means connected to said main frame and to said driver and being operated by said driver for shearing a rod, said shear means including first and second shear blades moving across each other, said first shear blade including an elongate hole for receiving a rod to be sheared, said second shear blade having a linear shearing edge, said elongate hole having an edge disposed obliquely in relation to the directional movement of said driver and said linear shearing edge of said second shear blade, said shear means shearing the rod when operated by said driver.

14. The apparatus of claim 13, wherein said shear means includes second and third elongate holes, each of the holes having a different width.

15. The apparatus of claim 13, wherein said first shear blade is removable to allow another shear blade with holes of different diameters or different widths to be connected to said main frame.

16. The apparatus of claim 13, wherein said elongate hole is oriented downwardly and away from said second shear hole.

17. The apparatus of claim 16 wherein said first shear blade includes three elongate holes and two circular holes.

* * * * *

UNITED STATES PATENT AND TRADEMARK OFFICE
CERTIFICATE OF CORRECTION

PATENT NO. : 4,945,751

DATED : August 7, 1990

INVENTOR(S) : Ralph Ireland

It is certified that error appears in the above-identified patent and that said Letters Patent is hereby corrected as shown below:

In column 15, line 24, delete "receiver", and substitute --receive--.

In column 16, line 14, delete "assembly", and substitute --movably--.

Signed and Sealed this

Twenty-fifth Day of February, 1992

Attest:

HARRY F. MANBECK, JR.

Attesting Officer     Commissioner of Patents and Trademarks